Jan. 3, 1939.                J. J. AGONIS                2,142,811
                            DRINKING GLASS
                         Filed May 6, 1938
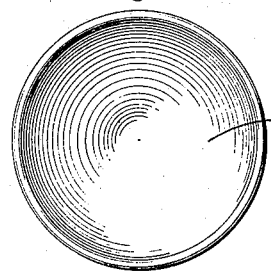
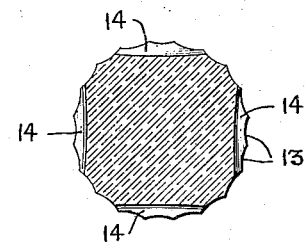
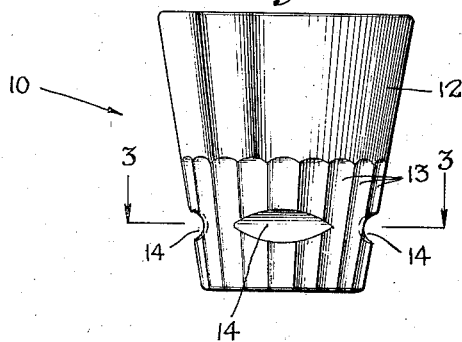
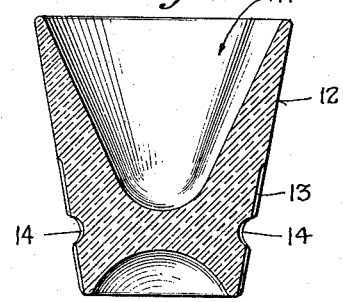
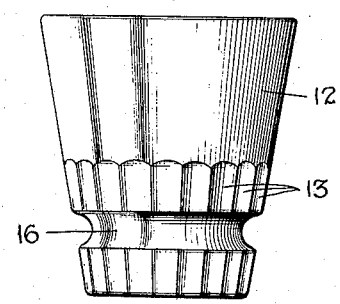
INVENTOR
John J. Agonis
BY
ATTORNEY Patented Jan. 3, 1939

2,142,811

UNITED STATES PATENT OFFICE 2,142,811

DRINKING GLASS

John J. Agonis, Bridgeport, Conn.

Application May 6, 1938, Serial No. 206,312

5 Claims. (Cl. 65—13)

The present invention relates to drinking glasses, and, more particularly, to the provision of means for forming a grip whereby the glasses can be held against slipping.

In using glasses which are not provided with handles or other projections, breakage occurs due to the glasses slipping from the hands of the person holding the same.

A very large percentage of this breakage occurs during washing of the glasses which have smooth outer surfaces which become very slippery when wet, and when handled by wet hands the glasses are very hard to hold. Further, if a soap or other cleaning medium, which is usually necessary to clean glasses, has been added to the water, it will tend to make the glasses even more slippery and difficult to handle and greatly increases the danger of breakage.

An object of the present invention is to provide a glass which can be readily gripped and held against slipping under all conditions. To accomplish this, the glasses are provided with indentations or depressions, preferably in the form of transversely extending grooves or notches cut in the outer surface thereof, to a sufficient depth that they will afford adequate grip so that the glasses can be readily held against slipping.

This is particularly advantageous when applied to tapered glasses, having smooth continuous outer wall surfaces, usually used for the serving of whiskey and the like liquors. When these glasses are held in the hand, the taper on the glass produces a component of the pressure with which it is held which extends longitudinally of the glass and tends to cause the glass to slip endwise from the hand. With the surface of the glass provided with depressions, notches or grooves, a person handling it will be afforded a means whereby he can grip it and hold it against longitudinal sliding movement with respect to the hand and prevent it from falling.

Other features and advantages of the invention will be apparent from the specification, when taken in connection with the drawing, in which:

Figure 1 shows a top plan view of the glass.

Fig. 2 shows a side elevation of one form of the invention.

Fig. 3 is a sectional view taken along the line 3—3 of Fig. 2.

Fig. 4 is a longitudinal section of the invention shown in Fig. 2.

Fig. 5 is a side elevation of another form of the invention.

As shown in the drawing, the invention is applied to glasses having smooth, continuous side wall surfaces which are not provided with handles or other projections by which they may be held. The illustrated form of the invention shows a glass 10 of the type in which whiskey or other liquor is served. The glass is provided with the usual liquid-receiving cavity 11 and has smooth, continuous outer wall surfaces 12. Such glasses are difficult to handle, inasmuch as there are no means thereon by which a grip can be had to prevent slipping.

The outerwall surfaces may be provided with longitudinal flutes 13, if desired. However, these do not afford a proper grip whereby the glass can be held against slipping as they extend along the longitudinal axis of the glass and in the direction in which the glasses slip.

During washing of these glasses, much breakage occurs, because the glasses become very slippery, and, when handled with wet hands, are hard to hold. If a soap or other cleaning medium is used, and this is usually necessary in order to clean the glasses, this adds to the problem, inasmuch as it tends to make the glasses even more slippery.

When the glasses have tapered outside surfaces, as is the usual construction, the danger of the glass slipping from the hand is greatly increased as the tapered side walls will produce a component of the pressure used to hold the glass which will extend longitudinally of the glass and tend to cause the glass to slide endwise in the hand.

In order to provide a gripping surface whereby the glasses can be held against slipping, I have provided depressions in the smooth outer surface which can be readily gripped, and the glass held against slipping.

In one form of the invention, the glasses are provided with spaced depressions, shown as being transversely extending notches 14, which may be positioned around the circumference of the glass as desired. In the preferred form of the invention, four such notches are provided so as to be diametrically opposed, as shown in Fig. 3. This will enable the glass to be readily gripped between the thumb and fingers, and held against slipping.

The notches can be formed in the glass by grinding, after the glasses have been made, or, if the glasses are pressed or molded, at the time they are made.

The notches can be positioned at any point along the surface of the glass intermediate the ends thereof. However, in the preferred form of the invention, they are disposed adjacent the base or small end, inasmuch as the glasses will tend to move with the large end first and, by placing the notches adjacent the small end of the glass, the holder will have an opportunity to effect a grip before the glass leaves his hand.

In Fig. 5 is shown another form of the invention, in which the gripping means is in the form of a circumferential groove 16 disposed adjacent the base. As will be observed, this groove will present an adequate gripping surface in all positions of the glass whereby it can be held from slipping.

As is shown in the drawing, the gripping means, whether it is a notch, groove or other form of depression, must have sufficient depth in order that the person handling the glass can effect a true grip. Preferably, the edges of the groove at the point where they engage the surface should be made sharp enough to form a sufficient antifriction surface to afford a proper grip and yet not so sharp as to cut the hand of the person using it.

Variations and modifications may be made within the scope of this invention and portions of the improvements may be used without others.

I claim:

1. A truncated conical drinking glass having a smooth outer wall presenting a substantially straight line from the top to the bottom thereof; and transversely extending grip means formed in said wall intermediate the top and bottom of the glass including a depression having a short radius of curvature in the direction of the longitudinal axis of the glass.

2. A truncated conical drinking glass having a smooth outer wall presenting a substantially straight line from the top to the bottom thereof; and transversely extending grip means formed in said wall intermediate the top and bottom of the glass including a depression having the side walls thereof forming a substantial angle with the surface of the outer wall to provide a surface engageable by the fingers to hold the glass against slipping.

3. A truncated conical glass having the walls thereof presenting a surface of uniform slope from the top to the bottom thereof; and having a plurality of depressed notches formed in the wall intermediate the top and bottom thereof to provide a grip whereby the glass can be held against slipping, the major axes of said notches being disposed transversely to the axis of the glass.

4. A truncated conical glass having the walls thereof presenting a surface of uniform slope from the top to the bottom thereof; and having a narrow, deep circumferential depressed groove intermediate the top and bottom thereof to provide a grip whereby the glass can be held against slipping.

5. A truncated conical glass having the walls thereof presenting a surface of uniform slope from the top of the bottom thereof; and having a plurality of oppositely disposed countersunk notches within the outer surface thereof to provide a grip whereby the glass can be held against slipping, the major axes of said notches being disposed transversely to the axis of the glass.

JOHN J. AGONIS.